United States Patent [19]
Hartner et al.

[11] Patent Number: 6,012,129
[45] Date of Patent: Jan. 4, 2000

[54] APPARATUS AND METHOD ALLOCATING VIRTUAL MEMORY UPON DEMAND

[75] Inventors: William Henry Hartner; David Medina; Mark Alan Peloquin; Charles Rudolph Schmitt, all of Austin; Allen Chester Wynn, Round Rock, all of Tex.

[73] Assignee: International Business Machines Corporation, Armonk, N.Y.

[21] Appl. No.: 08/829,636

[22] Filed: Mar. 31, 1997

[51] Int. Cl.[7] .................................................. G06F 12/00
[52] U.S. Cl. ........................... 711/170; 711/171; 711/203
[58] Field of Search ..................................... 711/170, 171, 711/203; 395/671, 674, 700, 183.13, 678, 676; 364/232.9

[56] References Cited

U.S. PATENT DOCUMENTS

| | | | |
|---|---|---|---|
| 4,297,743 | 10/1981 | Appell et al. | 395/676 |
| 4,703,417 | 10/1987 | Marganti et al. | 364/200 |
| 4,787,031 | 11/1988 | Karger et al. | 364/232.9 |
| 5,043,870 | 8/1991 | Ditzel et al. | 364/200 |
| 5,303,378 | 4/1994 | Cohen | 395/700 |
| 5,452,456 | 9/1995 | Mourey et al. | 395/700 |
| 5,481,719 | 1/1996 | Ackerman et al. | 395/678 |
| 5,761,407 | 6/1998 | Benson et al. | 395/183.13 |
| 5,765,205 | 6/1998 | Breslau et al. | 711/203 |
| 5,784,699 | 7/1998 | McMahon et al. | 711/171 |

FOREIGN PATENT DOCUMENTS

| | | |
|---|---|---|
| 63-292255 | 11/1988 | Japan . |
| 4-284555 | 10/1992 | Japan . |

*Primary Examiner*—John W. Cabeca
*Assistant Examiner*—Nasser Moazzami
*Attorney, Agent, or Firm*—David H. Judson; Jeffrey S. LaBaw

[57] ABSTRACT

An apparatus and method for allocating virtual memory upon demand to reduce the amount of virtual memory allocated. Privilege level transitions requested by a program of instructions invoke a fault handler routine which allocates memory for implementing the transition. Allocation of memory is thus delayed until such request for privilege level transition occurs.

24 Claims, 2 Drawing Sheets

APPARATUS AND METHOD ALLOCATING VIRTUAL MEMORY UPON DEMAND

FIELD OF THE INVENTION

The present invention relates, in general, to information handling systems and, in particular, to an apparatus and method for reducing the amount of virtual memory allocated to a program of instructions in an information handling system by allocating memory only upon demand.

BACKGROUND OF THE INVENTION

As computer environments become more and more complex, resources which were once taken for granted become a precious commodity. This is true today for virtual address space in the OS/2 operating system (OS/2 is a trademark of International Business Machines Corporation) environment where more and larger application programs require significant quantities of memory. The operating system itself requires more storage to properly manage and protect these applications.

The architecture of the x86 series of processor by the Intel Corporation (on which OS/2 is based) provides four distinct privilege levels at the hardware level. These range from Ring 0, the most trusted privilege level, to Ring 3, or application privilege level (Ring 1 is currently not used by OS/2). Privilege levels are used to improve reliability of the operating system by protecting resources from direct access by less trusted entities. Each of these privilege levels require unique resources which are pre-allocated and stored away for subsequent use upon ring transition.

Under OS/2, the Ring 2 privilege level is used to provide the input/output privilege level (IOPL), i.e. the privilege level or lower privilege levels in which code must be executing to be allowed by the Intel hardware to execute "sensitive" instructions. These sensitive instructions are typically used to manage physical devices and include, but are not limited to, I/O and interrupt servicing instructions, and are primarily useful for device-oriented situations where an application needs to query device status. The Applicants have determined that this ability is not required by the majority of tasks which come and go in a typical operational environment. Therefore, as will be described in the specification below, it is advantageous to delay the allocation of resources required for the Ring 2 stack segment until such time as they are actually required to reduce the amount of virtual memory allocated.

SUMMARY OF THE INVENTION

Accordingly, the present invention is directed to a method for reducing the amount of memory allocated to a program of instructions implemented in an information handling system having one or more processors, memory operably associated with the processors, an operating system stored in the memory, and a plurality of states in which instructions stored in the memory are executed. The method comprises the step of allocating memory for initializing a first set of states and allocating memory for initializing at least one selected state from the states when an attempt is made by one instruction or a set of instructions to transition to or from one of the states in the first set of states to or from the selected state.

The present invention is also directed to an information handling system comprising one or more processors, memory operably associated with the processors, an operating system stored in the memory, a plurality of states in which instructions stored in the memory are executed, and means for allocating memory for initializing a first set of the states and means for allocating memory for initializing at least one selected state from the states when an attempt is made by one instruction or a set of instructions to transition to or from one of the states in the first set of states to or from the selected state.

The present invention is also directed to a computer program product for implementing the above-described method.

The primary advantage of the present invention is the reduction of the amount of virtual memory allocated to a program of instructions.

Another advantage of the present invention is the allocation of virtual memory only upon demand.

Another advantage of the present invention is greater efficiency of virtual memory use.

Another advantage of the present invention is the reduction in thread creation time caused by not allocating virtual memory until needed.

DETAILED DESCRIPTION OF A PREFERRED EMBODIMENT OF THE INVENTION

Generally, the present invention provides an apparatus and method for reducing the amount of virtual memory allocated to a program of instructions.

In the following description, for purposes of explanation, specific program procedures, APIs, and configurations are set forth to provide a thorough understanding of the present invention. The preferred embodiment described herein is implemented with an OS/2 operating system created by IBM (IBM is a registered trademark of International Business Machines Corporation) and an Intel Corporation X86 series microprocessor. However, it will be apparent to one skilled in the art that the present invention may be practiced without the specific details and be implemented in various computer systems having various processors utilizing various operating systems and in various configurations or makes or models of tightly coupled processors or in various configurations of loosely coupled multiprocessor systems. The procedural descriptions and representations which follow are the means used by those skilled in the art to convey the substance of their work to others skilled in the art.

Figure 1:
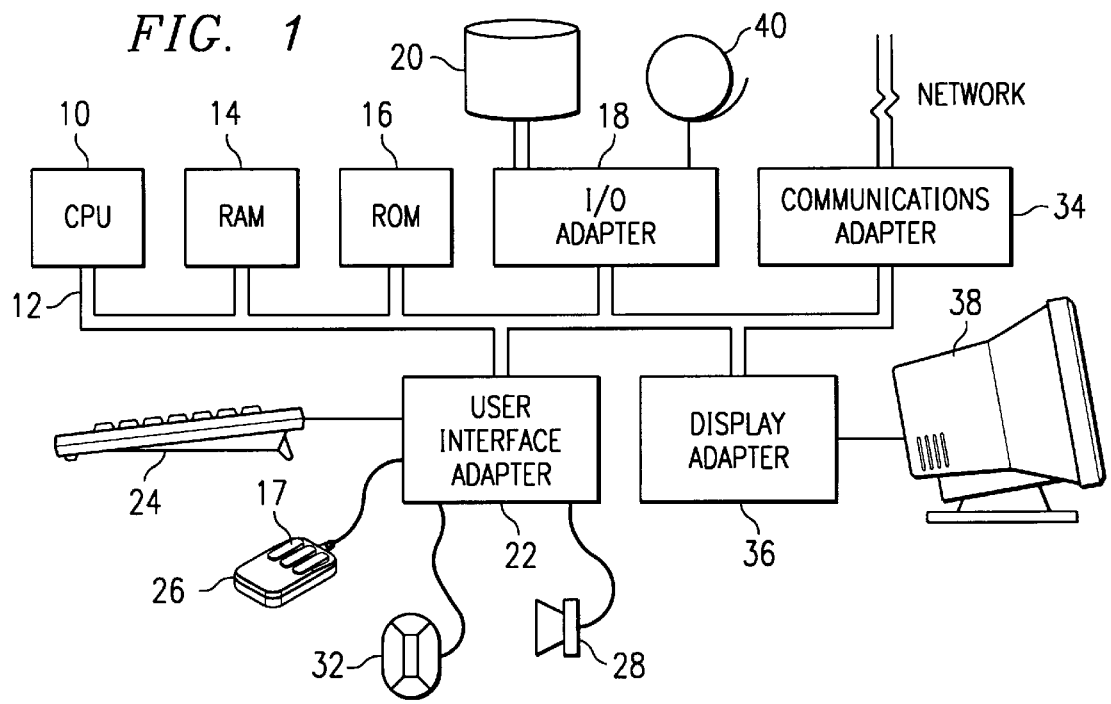
FIG. 1 is an information handling system embodying the present invention.

Referring now to FIG. 1, a representative hardware environment for practicing the present invention is depicted and illustrates a typical hardware configuration of a computer or information handling system in accordance with the subject invention, having at least one central processing unit (CPU) 10. CPU 10 is interconnected via system bus 12 to random access memory (RAM) 14, read only memory (ROM) 16, and input/output (I/O) adapter 18 for connecting peripheral devices such as disc units 20 and tape drives 40 to bus 12, user interface adapter 22 for connecting keyboard 24, mouse 26 having button 17, speaker 28, microphone 32, and/or other user interfaced devices such as a touch screen device (not shown) to bus 12, communication adapter 34 for connecting the information handling system to a data processing network, and display adapter 36 for connecting bus 12 to display device 38.

Figure 2:
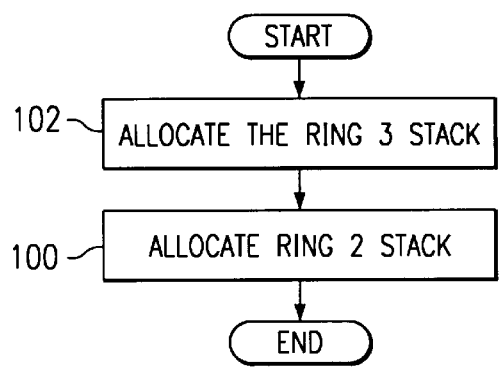
FIG. 2 is a flowchart depicting prior art stack allocations when a thread is being created.
Figure 3:
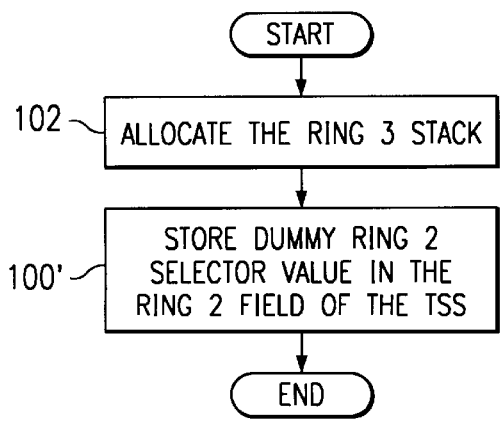
FIG. 3 is a flowchart illustrating stack allocations when a thread is being created according to the present invention.

When an operating system prepares to begin the execution of a new thread, there are several initialization steps to be performed. One of the required steps is to allocate the stacks in virtual memory which the threads will need or may need to use in order to run. Normally, the operating system would allocate the stacks for each privilege level in which the thread could possibly execute. For OS/2, stacks would be created for the privilege levels 0, 2, and 3. FIG. 2 illustrates the creation of the stacks for privilege levels 2 and 3 in steps 100 and 102, respectively. This figure shows that normally, when a thread is being created, a region of memory is reserved for the stack used when this thread is operating at privilege level 2. FIG. 3 further illustrates how step 100 is altered in the present invention. Instead of allocating the stack for privilege level 2 as the thread is being created, a specific value which indicates that the stack for privilege level 2 was not yet allocated is stored in a task state segment (TSS), thus deferring the allocation to a later time, if needed. Any thread or process that would require execution of any "sensitive" instruction would require a transition to a privilege level less than or equal to IOPL. This class would encompass threads/processes that require device communication or control. This can happen in the form of I/O instructions and interrupt servicing. This class would also include inter-thread or inter-process interrupt serialization to maintain the integrity of common data structures.

The dynamic nature of OS/2 does not allow knowing in advance the exact code paths a program might take. Under certain conditions, dynamically loadable libraries (DLLS) that make transitions to the IOPL can be loaded, while under other circumstances the DLLs might not be loaded. Also, even if a DLL capable of executing an IOPL were to be loaded, there is no guarantee that a transition to the IOPL would necessarily have to occur.

By delaying the allocation right until the time it is actually required provides the best way of insuring it is done only when needed. The remainder of the steps necessary to prepare the thread for execution are unaltered, are well known in the art, and the details of such will not be described as they are unnecessary for an understanding of the present invention.

Figure 4:
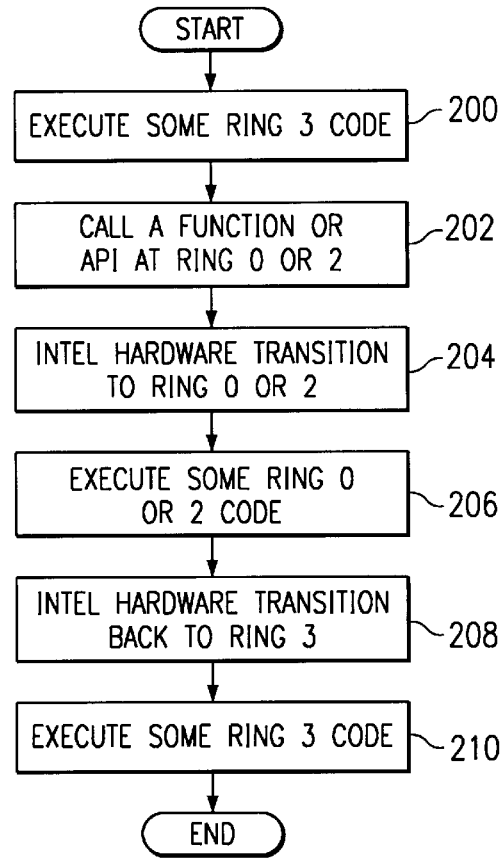
FIG. 4 is a flowchart illustrating the steps implemented by a processor in making privilege level transitions from a first privilege level to a second privilege level according to prior art.

Threads are created at privilege level 0, and once initialized, the thread begins to execute instructions while running at privilege level 3. Depending on the specific code executing within the thread, a privilege level transition could be requested. The transition could be to either privilege level 0 or 2. FIG. 4 depicts the role of the Intel processor as a thread running at privilege level 3 (see step 200) calls code which resides in another privilege level. Privilege level transitions from privilege level 3 to privilege level 0 or 2 occur as a result of calling functions or APIs that reside in another privilege level, servicing an external interrupt, or handling a trap or fault (see steps 202 and 204).

The Intel architecture provides a number of protected mode exceptions or system faults which are detected by hardware. An operating system has the ability to install full handlers for these exceptions or system faults which are allowed to resolve the faulting situation and resume execution at the faulting instruction. One of these restartable system faults or exceptions is issued when an invalid TSS is encountered. This data structure is used during a ring transition to record the processor state information. The TSS is defined by a descriptor which contains information including the limit, privilege level, and base address of the segment. The TSSes are allocated a stack of virtual memory space by the operating system to record information for privilege level transitions.

The present invention also requires changes to the fault handlers that get invoked when a called function or API results in a privilege level transition error. The actual processor calling mechanism is known as a call gate. The call gate is the method which initiates the hardware privilege level transition in the Intel processor. When the transition is complete, the processor begins executing the called instructions at the new privilege level (see step 206). When the function or API is complete, the hardware returns to the original privilege level of 3 (see step 208) and continues executing code at that level (see step 210). It will be appreciated that in the preferred embodiment of the invention, there are no intermediate transition states between privilege levels, but such intermediate transition states may be possible.

Figure 5:
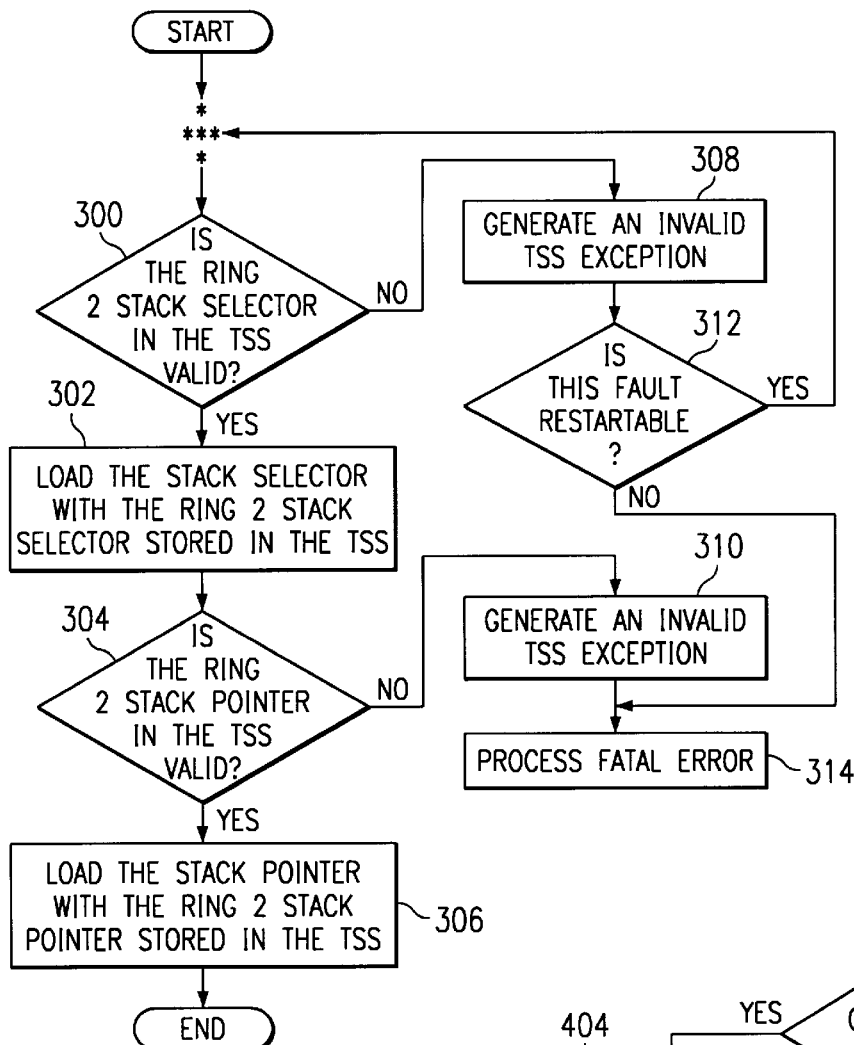
FIG. 5 is a flowchart illustrating the steps performed by a processor in making a privilege level transition from a first privilege level to a second privilege level according to the present invention.

Referring now to FIG. 5, a detailed flowchart illustrating the process which occurs in the hardware during a privilege level transition of a call gate is shown. There are many steps required to perform a privilege level transition. For complete details of this procedure, please refer to the Intel Processor Family Developer's Manual. For example, the Intel processor executes microcode to perform privilege level transitions. The flow chart of FIG. 5 focuses only on those steps necessary to describe the present invention.

As one of the steps performed during a call gate privilege level transition, the processor checks the stack selector value which is stored in the appropriate field for the target privilege level in the TSS to determine if the contents are valid (see step 300). It will be appreciated that any operating system running on Intel processors must make use of the TSS, and other non-Intel processors may implement a TSS or equivalent. Assuming the contents of the TSS are valid, the processor's stack selector, known as the SS register, gets loaded with the value from the TSS (step 302). The same check is done for the target privilege level's stack pointer (step 304), and if valid, the SP register is reloaded (step 306). Assuming both values are valid, the transition is complete, and execution resumes at the address of the called function or API at the new privilege level. However, if the value for either the stack selector or the stack pointer is not valid, the processor generates a fault known as an Invalid TSS Exception, and control is then passed to the exception or fault handler for that fault (steps 308 and 310). If the exception or fault handler was able to correct the faulting condition, the processor can then restart the faulting instruction, and execution continues (step 312). If the fault is not correctable, a fatal error is generated (step 314).

Figure 6:
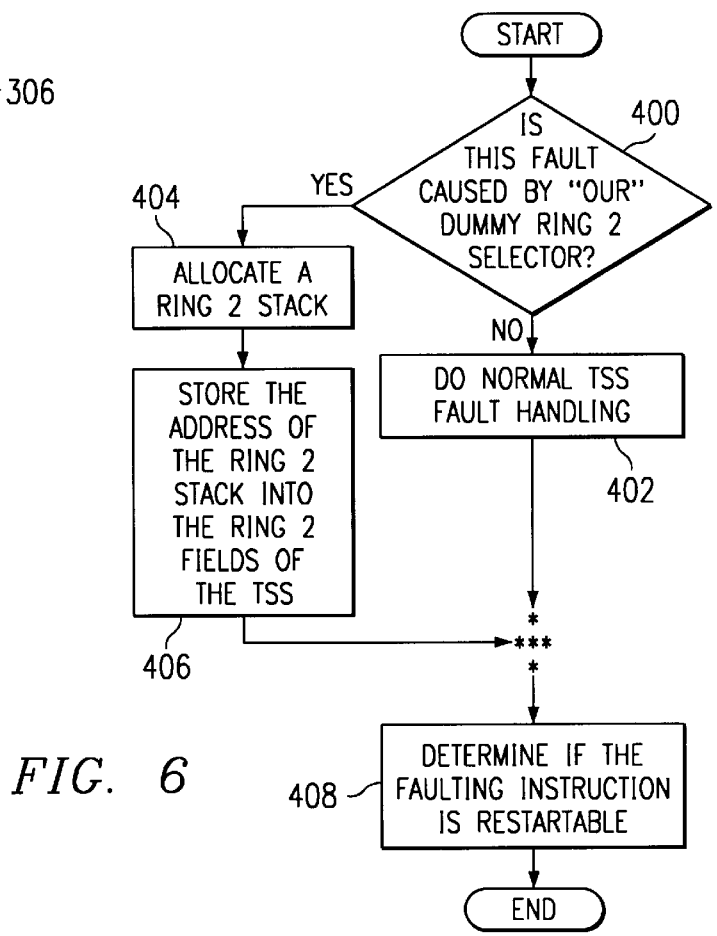
FIG. 6 is a flowchart illustrating the process of FIG. 5 in greater detail by illustrating a fault handler according to the present invention.

The present invention takes advantage of the fact that the hardware in the Intel processor will generate an Invalid TSS Exception if the target privilege level's stack selector is invalid. Since during the creation of the thread an invalid specific value was stored in the Ring 2 Stack Selector value in the TSS, an Invalid TSS Exception will be generated when this thread attempts to transition to Ring 2. FIG. 6 shows how the exception or fault handler for Invalid TSS faults is modified according to the present invention.

First, the Invalid TSS Exception or fault handler determines if the fault was caused by the invalid specific value stored in the TSS when the thread was created (step 400). If the fault was not caused by this value, then the exception is processed according to current protocol of OS/2 and Intel processor (see step 402). If the fault was caused by the invalid specific value, then the following steps are performed: a region of virtual memory is allocated for privilege level 2 stack (step 404), the fields in the TSS are updated with the actual stack selector and stack pointer values pointing to the newly allocated stack, the exception or fault handler is set to return to the faulting instruction for restart, and the exception or fault handler process is terminated(step 406).

Next, control is returned to the Intel processor microcode for call gates, which control the privilege level transitioning, to test to see if the fault is restartable (step 408 in FIG. 6 and step 312 in FIG. 5). If the fault is restartable, the hardware re-attempts to initiate the privilege level transition and, this time finding valid values in the TSS fields, completes the transition.

This above description is, of course, a specific implementation of the present invention for the OS/2 operating system. However, the scope of the present invention is not specific to OS/2 or the Intel processor. The concept embodied in the present invention is to reduce the unnecessary consumption of critical system resources by allocating those resources just at the time they are actually needed, by the use of restartable operating system/hardware faults. The faults are used to detect an allocation requirement and to perform that requirement and make the needed operating system management to allow the use of that allocation. This reduces the demands on the operating system and limits the use of critical resources to only those aspects of the operating system that are using them, rather than those that might use them. It will be appreciated that the present invention may be implemented in a multiple processor embodiment as well as a single processor embodiment. It will also be appreciated that the present invention may be implemented in a non-threaded operating system, i.e. an operating system which uses processes instead of threads.

Although the invention has been described with a certain degree of particularity, it should be recognized that elements thereof may be altered by persons skilled in the art without departing from the spirit and scope of the invention. One of the embodiments of the invention can be implemented as sets of instructions resident in the random access memory 14 of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. In an information handling system having one or more processors, memory operably associated with the processors and an operating system stored in the memory, a method for reducing the amount of memory allocated to an execution thread on said operating system, said method comprising the step of:
   upon initialization of said execution thread, allocating memory for storing at least a first set of operational data, said first set of operational data controlling operational flow of said execution thread when said execution thread is executing in a first state; and
   upon transition of said execution thread to a second state, allocating memory for storing a second set of operational data, said second set of operational data controlling operational flow when said execution thread is executing in said second state.

2. The method, as recited in claim 1, wherein the memory allocated in said steps of allocating memory is virtual memory.

3. The method, as recited in claim 1, further comprising the steps of:
   generating an exception when a fault instruction attempts to transition to or from said second state.

4. The method, as recited in claim 3, wherein said step of generating an exception includes the step of executing a trap handler.

5. The method, as recited in claim 4, wherein said trap handler executes the step of:
   allocating memory for initializing said selected state.

6. The method, as recited in claim 5, further including the steps of:
   clearing the exception; and
   re-executing the fault instruction.

7. The method, as recited in claim 4, wherein said trap handler is implemented by the operating system.

8. The method, as recited in claim 1, wherein said first and second states are privilege levels.

9. An information handling system comprising:
   one or more processors;
   memory operably associated with the processors;
   an operating system stored in the memory;
   an execution thread on said operating system;
   means, upon initialization of said execution thread, for allocating memory for storing at least a first set of operational data, said first set of operational data controlling operational flow when said execution thread is executing in a first state; and
   means, upon transition of said execution thread to a second state, for allocating memory for storing a second set of operational data, said second set of operational data controlling operational flow of said execution thread when said execution thread is executing in said second state.

10. The information handling system, as recited in claim 9, wherein said means for allocating memory includes means for allocating virtual memory.

11. The information handling system, as recited in claim 9, further comprising:
   means for generating an exception when a fault instruction attempts to transition to or from said second state.

12. The information handling system, as recited in claim 11, wherein said means for generating an exception includes a trap handler.

13. The information handling system, as recited in claim 12, wherein said trap handler includes means for allocating memory for initializing said selected state.

14. The information handling system, as recited in claim 13, further including:

means for clearing said exception; and means for re-executing said fault instruction.

15. The information handling system, as recited in claim 12, wherein said trap handler is implemented by said operating system.

16. The information handling system, as recited in claim 9, wherein said first and second states are privilege levels.

17. A computer program product in a readable medium readable by a computer system for running an operating system including at least one execution thread, said computer system having one or more processors and memory operably associated with the processors, said computer program product comprising:

means, upon initialization of said execution thread, for allocating memory for storing at least a first set of operational data, said first set of operational data controlling operational flow when said execution thread is executing in a first state; and means, upon transition of said execution thread to a second state, for allocating memory for storing a second set of operational data, said second set of operational data controlling operational flow when said execution thread is executing in said second state.

18. The computer program product in a readable medium, as recited in claim 17, wherein said means for allocating memory includes means for allocating virtual memory.

19. The computer readable medium, as recited in claim 17, further comprising:

means for generating an exception when a fault instruction attempts to transition to or from said second state.

20. The computer program product in a readable medium, as recited in claim 19, wherein said means for generating an exception includes means for executing a trap handler.

21. The computer program product in a readable medium, as recited in claim 20, wherein said trap handler includes means for allocating memory for initializing said selected state.

22. The computer program product in a readable medium, as recited in claim 21, further comprising:

means for clearing said exception; and means for re-executing said fault instruction.

23. The computer program product in a readable medium, as recited in claim 20, wherein said trap handler is implemented by said operating system.

24. The computer readable medium, as recited in claim 17, wherein said first and second states are privilege levels.

* * * * *